United States Patent
Bhargava

(10) Patent No.: US 10,400,358 B2
(45) Date of Patent: *Sep. 3, 2019

(54) NYLON BASED FILAMENTS, YARNS, AND FABRICS

(71) Applicant: Shakespeare Company, LLC, Boca Raton, FL (US)

(72) Inventor: Saumitra Bhargava, Clarksville, MD (US)

(73) Assignee: Shakespeare Company, LLC, Greer, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/042,557

(22) Filed: Jul. 23, 2018

(65) Prior Publication Data

US 2018/0334761 A1    Nov. 22, 2018

Related U.S. Application Data

(63) Continuation of application No. 15/466,480, filed on Mar. 22, 2017, now Pat. No. 10,053,799, which is a continuation-in-part of application No. 15/115,410, filed as application No. PCT/US2015/013753 on Jan. 30, 2015, now Pat. No. 9,834,868.

(60) Provisional application No. 62/311,562, filed on Mar. 22, 2016, provisional application No. 61/933,997, filed on Jan. 31, 2014.

(51) Int. Cl.
*D01F 6/90*    (2006.01)
*D01F 8/12*    (2006.01)

(52) U.S. Cl.
CPC ............... *D01F 6/90* (2013.01); *D01F 8/12* (2013.01); *C08L 2205/02* (2013.01); *D10B 2331/02* (2013.01)

(58) Field of Classification Search
None
See application file for complete search history.

(56) References Cited

U.S. PATENT DOCUMENTS

| | | | |
|---|---|---|---|
| 3,393,252 A * | 7/1968 | Zimmerman | C08G 69/00 152/451 |
| 3,553,288 A | 1/1971 | Oda et al. | |
| 3,720,576 A | 3/1973 | Fujisaki | |
| 5,075,168 A * | 12/1991 | Maruyama | D01F 6/90 428/364 |
| 5,500,473 A | 3/1996 | Wissmann | |
| 5,618,885 A | 4/1997 | Kotek et al. | |
| 9,834,868 B2 * | 12/2017 | Bhargava | C08G 69/265 |
| 10,023,978 B2 * | 7/2018 | Bhargava | C08G 69/265 |
| 10,053,799 B2 * | 8/2018 | Bhargava | D01F 6/90 |
| 2003/0045641 A1 | 3/2003 | Akkapeddi et al. | |
| 2013/0309928 A1 | 11/2013 | Desio et al. | |

FOREIGN PATENT DOCUMENTS

| | | |
|---|---|---|
| EP | 0609792 A1 | 8/1994 |
| EP | 1659199 A2 | 5/2006 |
| JP | 2743520 B2 | 4/1998 |
| WO | 2010/132450 A2 | 11/2010 |

OTHER PUBLICATIONS

International Search Report and Written Opinion, PCT/US15/13753, 14 pages, dated Apr. 9, 2015.
International Search Report and Written Opinion, PCT/US17/023639, 16 pages, dated Jun. 20, 2017.

* cited by examiner

*Primary Examiner* — Ana L. Woodward
(74) *Attorney, Agent, or Firm* — Eversheds Sutherland (US) LLP

(57) ABSTRACT

Nylon based filaments, yarns, and fabrics having improved properties are provided. A filament contains a composite material formed from a (i) a main structural component containing a mixture of one or more base nylons and one or more secondary nylons, and optionally (ii) an additive component mixed with the main structural component. The one or more base nylons may include one or more aliphatic nylons and the one or more secondary nylons may include one or more semiaromatic nylons.

16 Claims, No Drawings

NYLON BASED FILAMENTS, YARNS, AND FABRICS

CROSS-REFERENCE TO RELATED APPLICATIONS

This application is a Continuation of U.S. application Ser. No. 15/466,480, filed Mar. 22, 2017, which claims the benefit of U.S. Provisional Patent Application No. 62/311,562, filed Mar. 22, 2016, and which is a Continuation-in-Part of U.S. Pat. No. 9,834,868, which is a national stage entry of International Application No. PCT/US15/13753, filed Jan. 30, 2015, which claims priority to U.S. Provisional Application No. 61/933,997, filed Jan. 31, 2014. Each of these applications is incorporated by reference herein.

TECHNICAL FIELD

The present application relates generally to nylon based filaments, yarns, and fabrics, and relates more specifically to nylon based filaments containing a base nylon and a secondary nylon, and yarns and fabrics formed therefrom.

BACKGROUND

Polyester fabrics currently dominate the activewear market and are becoming popular in mainstream clothing fabrics because of their resistance to wrinkling and low-moisture uptake. Meanwhile, relative to polyester fabrics, nylon fabrics offer lower coefficient of friction, dramatically reduced wear (i.e., loss of material over time), lower propensity to generate static, and improved feel, but suffer from wrinkling and dimensional changes when wet.

Thus, there is a need for filaments, yarns, and fabrics having the beneficial properties of nylon with improved properties such as improved resistance to wrinkling and dimensional changes.

SUMMARY

In one aspect, a multifilament is provided that includes a filament that contains a composite material formed from (i) a main structural component containing a mixture of one or more aliphatic nylons and one or more semiaromatic nylons, and optionally (ii) an additive component mixed with the main structural component.

In another aspect, a multifilament is provided that includes a filament that contains a composite material formed from (i) a main structural component containing a mixture of one or more base nylons and one or more secondary nylons, and optionally (ii) an additive component mixed with the main structural component, wherein the one or more base nylons and the one or more secondary nylons are present in amounts such that the filament has a greater tenacity than an otherwise equivalent filament having a main structural component formed only of the one or more base nylons.

In yet another aspect, a fabric is provided that contains a multifilament that includes a plurality of filaments containing a composite material formed from a mixture of (i) a main structural component containing one or more base nylons and one or more secondary nylons, and optionally (ii) an additive component, wherein the one or more base nylons and the one or more secondary nylons are present in the filaments in amounts such that each filament has a greater tenacity than an otherwise equivalent filament having a main structural component formed only of the one or more base nylons.

DETAILED DESCRIPTION

Nylon based filaments and yarns and fabrics made therefrom are disclosed herein. The nylon based filaments possess one or more improved properties as compared to known nylon filaments. In particular, embodiments of the nylon filaments and yarns disclosed herein may display one or more of: improved tenacity, resistance to wrinkling, and resistance to dimensional changes when wet as compared to otherwise equivalent nylon filaments formed from conventional nylon materials.

As used herein, the term "filament" is used broadly to refer to a thread or fiber-like structure, and refers generally to filaments that are monofilaments or multifilaments. For example, the filaments may be made in a typical extrusion process or other known process. As used herein, the term "multifilament" refers broadly to multifilament yarns or fibers in which a plurality of filaments are combined, such as in a typical yarn spinning process.

In certain embodiments, the nylon based filaments disclosed herein are formed from a composite material. The composite material is a mixture of a main structural component containing one or more base nylons and one or more secondary nylons, and optionally an additive component.

As used herein, the phrase "main structural component" refers to the polymer mixture (e.g., the mixture of one or more base nylons and one or more secondary nylons) that forms the bulk of the filament and provides the structural properties thereto. That is, any additive component, coating or finish, or other supplemental material combined with the main structural component to form the filament, does not significantly alter the structural properties of the filament imparted by the main structural component.

As used herein, the phrase "an additive component" refers to one or more suitable additive materials that are distinct from the polymers forming the main structural component and that do not significantly alter the structural properties of the filament as imparted by the main structural component. The additive component is optional. For example, the additive component may be present in the composite material in an amount of up to about 3 percent, by weight. For example, the additive component may be present in the composite material in an amount of from about 0.1 percent, by weight, to about 3 percent, by weight. In certain embodiments, the additive component is present in the composite material in an amount of from about 0.1 percent, by weight, to about 1.5 percent, by weight. As used herein, the term "about" is used to refer to plus or minus 5 percent of the numerical value of the number with which it is being used.

The one or more materials of the additive component may be premixed with one or more of the nylon components or may be combined with the nylon components as a separate ingredient. For example, the additive component may include one or more additive materials selected from dyes, pigments, optical brighteners, stabilizers, anti-static agents, antimicrobial agents, and mixtures thereof. For example, the additive materials may be selected from agents containing fumed silica, activated carbon or other species which are difficult to incorporate in filaments. Additionally, functional additives such as remediation or catalytic materials may be used. Other suitable additives are known in the filament processing industry and may also be used.

Thus, the filaments described herein are formed of a composite mixture, or blend, of the base nylon(s), the secondary nylon(s), and any additive component. The additive materials of the additive component may be present as a component of one or more of the nylon(s) prior to mixing or may be introduced as a separate component into the mixing process. Suitable coatings and/or finishes may be applied to the filaments described herein.

In certain embodiments, the one or more base nylons and the one or more secondary nylons are present in the composite mixture in amounts such that the filament has a greater tenacity than an otherwise equivalent filament having a having a main structural component formed only of the one or more base nylons. For example, the filament may have a tenacity that is from about 40% to about 60% higher than the tenacity of an otherwise equivalent filament formed only of the one or more base nylons (i.e., without the one or more secondary nylons).

As used herein, the phrase "otherwise equivalent filament" when used to define one or more relative properties of the filaments, yarns, or fabrics disclosed herein, refers to filaments, yarns, or fabrics that have been manufactured in identical processes to have identical dimensions, filament count, etc., but in which the composite material differs in the main structural component containing only the one or more base nylons. That is, the "otherwise equivalent filament" refers to a filament that is identical to the relevant filament of the present disclosure other than the composition of the main structural component, which includes no secondary nylons.

It has been discovered that improved properties such as increased strength and improved resistance to wrinkling and dimensional changes can be achieved in filaments, and the yarns and fabrics formed therefrom, through the use of particular base nylons and secondary nylons. In some embodiments, the one or more base nylons are one or more aliphatic nylons and the one or more secondary nylons are one or more amorphous nylons.

For example, suitable aliphatic nylons include nylon 6,6, nylon 6, nylon 6,69, nylon 6,66, nylon 66,6, nylon 6,12, nylon 6,10, nylon 11, nylon 12, other aliphatic nylon copolymers, and mixtures thereof. In certain embodiments, the one or more base nylons are selected such that they have a glass transition temperature of less than 80° C., such as in the range of about 15° C. to about 75° C., or in the range of about 20° C. to about 70° C. For example, nylon 6 (wet or in high humidity) has a glass transition temperature of about 20° C., nylon 6,6 (wet or in high humidity) has a glass transition temperature of about 25° C., nylon 6 (with less than 0.1% moisture in nylon) has a glass transition temperature of 47° C., and nylon 6,6 (with less than 0.1% moisture in nylon) has a glass transition temperature of 70° C.

For example, suitable amorphous nylons include those that are semiaromatic, such as those with a phenyl ring. In certain embodiments, the one or more secondary nylons are amorphous semiaromatic nylons selected from MXD6, 6I/6T, 6T/6I, DT/DI, DI/DT, 6I/6T/DI/DT, 6I/DI, 6T/DT, Dicycan-I, Dimetyldicycan-I, Dimethyldicycan-T, and Dicycan-T, nylon copolymers containing 6I, 6T, DI, DT or Dicycan, and mixtures thereof. In certain embodiments, the one or more secondary nylons are selected such that they have a glass transition temperature of at least 80° C., such as in the range of about 80° C. to about 150° C., or in the range of about 110° C. to about 140° C. For example, nylon 6I/6T having a weight ratio of 2:1 has a glass transition temperature of about 130° C.

As used herein, the following nomenclature is used in accordance with usage in the industry, as indicated. I: isophthalic acid; T: terephthalic acid; 6I/6T: copolymer made of hexamethylene diamine, isophthalic acid, and terephthalic acid; 6I: hexamethylene diamine-isophthalic acid; 6T: hexamethylene diamine-terephthalic acid; 612: hexamethylene diamine-dodecanedioic acid; 610: hexamethylene diamine-sebacic acid; D: 2-Methylpentamethylenediamine; MXD6: polyamide produced by polycondensation of MXDA with adipic acid.

It has surprisingly been discovered that incorporation of even a small amount of the secondary nylon(s) into a filament composite containing the base nylon(s) results in a shift in various material properties of the filament that impact performance and wrinkling. In particular, the glass transition temperature and crystallization behavior, moisture uptake behavior, and tenacity of the filament, and the yarns formed therefrom, may be impacted by incorporating at least 2 percent, by weight, of the secondary nylon(s) into the composite material. In some embodiments, the secondary nylon(s) are present in the composite material in an amount of from about 2 percent, by weight, to about 10 percent, by weight. In certain embodiments, the secondary nylon(s) are present in the composite material in an amount of from about 2 percent, by weight, to about 6 percent, by weight. For example, in filaments having a size of from 1 to 3.4 dpf, the secondary nylon(s) may be present in the range of about 2 percent, by weight, to about 6 percent, by weight, such as about 4 percent, by weight. For example, in filaments having a size of from 10 to 20 dpf, the secondary nylon(s) may be present in the range of about 4 percent, by weight, to about 10 percent, by weight, such as about 6 to about 8 percent, by weight, or about 6 percent, by weight.

It has surprisingly been discovered that incorporation of even a small amount of the secondary nylon(s) into a filament composite containing the base nylon(s) results in a shift in the crystallization behavior of the material with minimized phase separation of the material. In particular, the filaments and yarns of the present disclosure may have a higher temperature of onset of crystallization than an otherwise equivalent filament having a having a main structural component formed only of the one or more base nylons. This shift in crystallization behavior results in the composite material being able to be drawn to a higher degree during processing, as is discussed in greater detail below and in the Examples. This beneficially enables processing of the filaments at an increased speed, and therefore at an increased output. For example, yarns manufactured in a fully drawn yarn process using the presently disclosed filaments may be able to be drawn at a draw ratio that is at least 20% greater than an otherwise equivalent filament having a main structural component formed only of the one or more base nylons, on the same equipment, with no operability loss. For example, an increase in draw ratio of about 40% over an otherwise equivalent filament having a main structural component formed only of the one or more base nylons has been observed.

Furthermore, without intending to be bound by a particular theory, it is believed that the increased glass transition temperature provides improved wrinkle resistance to the disclosed filaments, yarns, and fabrics. For example, it is suspected that these composites provide wrinkle resistance because of a rise in glass transition temperature of the formulation. As mentioned above, nylon 6 and nylon 6,6 have glass transition temperatures around the room temperature when exposed to high humidity or water. Having a glass transition temperature near room temperature allows the molecules of nylon mobility which results in a molecule able to adapt newer configuration which results in wrinkles. Meanwhile, polyester has a glass transition temperature much higher than room temperature leading to locked molecules at room temperature and thus no changes in molecular configuration leading to natural wrinkle resistance.

Prior to the present discovery, it was understood that combining a small amount of a secondary polymer having distinct crystallization properties with a majority component of another polymer having a faster crystallization time resulted in phase separation due to the majority component crystallizing faster. Thus, it was previously believed that the secondary polymers described herein were effective to split or shear filaments containing the base polymers described herein. Thus, it was unexpected that uniform filaments formed of the composite mixtures described herein could even be achieved, let alone that the filaments would display the improved wrinkle resistance and strength properties that have been observed. For example, it is believed that, for the presently disclosed filaments, the phase separation of the main structural component is minimized and/or the base and secondary nylons are partially miscible. Specifically, a 3 dpf filament having a diameter of 20 micron has been manufactured. Due to the observed draw characteristics and tenacity, it has been determined that the domains (i.e., volumes of inclusion of the materials) must be much smaller than the diameter of the filament (i.e., less than a micron). Otherwise, breakage and decreased strength would be observed.

It is also believed that improved wrinkle resistance of the disclosed filaments, yarns, and fabrics is achieved though providing the secondary nylon(s) in the composite in an amount such that the moisture uptake properties of the filaments are altered. Because wrinkling of fabrics is also caused by uneven filament and yarn drying (e.g., when a portion of the filament or yarn is wet and other portions are dry, a wrinkle forms due to the difference in dimensions caused by moisture presence), reducing the propensity of the filaments to take on moisture improves the wrinkle resistance of a fabric made therefrom.

In particular, the moisture uptake by nylon 6 and nylon 66 are known to be significant. For example, a wet nylon 6 yarn can absorb more than 5% of its weight in water within the molecular structure. As demonstrated by the Examples below, it was surprisingly found that incorporation of even a small amount of the secondary nylon(s) into a filament composite containing the base nylon(s) results in a decrease in overall moisture absorption and absorption rate. In addition, dimensional changes of the wet filaments were less than observed in otherwise equivalent filaments in which the main structural component contains only the base nylon. In particular, the filaments and yarns disclosed herein may have a smaller relative length change when soaked in water than an otherwise equivalent filament having a main structural component containing only the base nylon. Moreover, the filaments and yarns disclosed herein may have a smaller enthalpy of drying than otherwise equivalent filaments in which the main structural component contains only the base nylon.

Moreover, it has been discovered that incorporation of even a small amount of the secondary nylon(s) into a filament composite containing the base nylon(s) results in filaments and yarns having a greater tenacity (i.e., strength) for the same weight filament. In particular, as described in the Examples, the filament may have a tenacity that is from about 40% to about 60% higher than the tenacity of an otherwise equivalent filament having a main structural component formed only of the one or more base nylons. Thus, a fabric may beneficially be formed of the same weight of the presently disclosed yarn and may display increased strength characteristics. Alternatively, a fabric having identical strength characteristics may be lighter weight than a fabric formed of otherwise equivalent yarn. For example, if the yarn's tenacity is 30% higher than an otherwise equivalent yarn, then a fabric formed from the high tenacity yarn can be reduced in weight by 30%. Such lightweight, high strength fabrics formed from nylon are particularly desirable in activewear applications (e.g., athletic jerseys). The tenacity of the filaments and yarns disclosed herein may range from about 3 to about 11 grams per denier with higher tenacity reached with multiple draw zones.

The filaments described herein may be formed to have any suitable dimensions and cross-sectional shape. For example, the filaments may have a round, trilobal, or any other suitable cross-sectional shape. For example, the filaments may have a denier per fiber of from about 0.1 dpf to about 3.5 dpf, such as from about 0.8 to about 3.5 dpf. For example, such filaments may be suitable for use in apparel fabrics. Other filaments may have a denier per fiber of from about 3.5 dpf to about 11 dpf. For example, such filaments may be suitable for use in seat belts or other harnesses.

In certain embodiments, a fabric is provided that is formed from a multifilament (i.e., yarn) formed from one or more of the filaments described herein. The fabric may be constructed by any suitable means, including weaving or knitting. It is believed that fabrics formed from the filaments described herein may be manufactured to have a denier that is lower than previously achievable with conventional nylon based filaments. For example, the fabrics formed from the filaments described herein may have a denier of as low as 40 denier. As described above and in the Examples, the filaments and yarns described herein beneficially impart improved wrinkle resistance and strength properties to a fabric formed therefrom. Moreover, such fabrics also maintain the reduced wear, lower coefficient of friction, and lower propensity to generate static that are associated with traditional nylon fabrics.

The fabrics and yarns described herein may be formed exclusively from the filaments described herein or may contain a combination of the filaments described herein and other nylon or other synthetic or natural filaments.

As discussed further herein, the filaments, yarns, and fabrics described herein may be made by any suitable process or apparatus known in the industry. For example, any known filament extrusion, melt spinning process know in the art may be used. For example, a multifilament yarn may be made by a standard fully drawn yarn process, such as one that forms a continuous 34 filament 100 denier yarn, as described in the Examples. For example, a standard one-step bulked continuous filament process may be used to produce the yarns described herein, such as a 20 dpf, 1000 denier yarn that may be suitable for carpet applications.

The filaments, yarns, and fabrics described herein may be textured or crimped, as desired for the particular application. This textured yarn is knitted, tufted, or woven into a fabric. It can be dyed in yarn form or in a fabric form. Beneficially, the dye wash fastness and flexibility of coloration for nylon materials, such as the filaments described herein, is much greater than polyester.

The filaments and yarns described herein can also be used in applications other than fabrics, including narrow gauge bands (such as for seat belts and other harnesses), tire cords, carpets, and ropes. Moreover, the filaments described herein may also be used in monofilament applications, such as fishing line, musical instrument strings, filtration fabric, the hook portion of hook/loop fasteners, conveyor belts, and thread.

Accordingly, the presently described filaments provide improved properties such as increased strength and improved resistance to wrinkling and dimensional changes can be achieved in filaments, and the yarns and fabrics formed therefrom, through the use of particular base nylons and secondary nylons. This technology allows the addition of wrinkle resistance to nylon fabrics with minimal change to fiber spinning, dyeing, or fabric construction. Moreover, the improved processability as well as the improved filament uniformity and tenacity observed is crucial to many types of fibers produced with nylon including seat belts, filtration fabrics, tire reinforcement cords, sewing filaments, and high performance luggage fabrics. Additionally, certain applications of nylon yarns and filaments, in particular sail fabrics and seat belt/harnesses benefit greatly from the reduced dimensional change when wet that has been observed.

Thus, the present disclosure allows for the manufacture of nylon based yarns and fabrics that display one or more of the beneficial properties of traditional nylon materials (e.g., lower coefficient of friction, reduced wear, lower propensity to generate static, and improved feel) while also displaying a resistance to wrinkling and moisture uptake that is typical of polyester based materials.

The foregoing disclosure may be further understood and illustrated by the following non-limiting Examples. In particular, while the Examples generally disclose base nylons of nylon 6 and nylon 6,6 in combination with secondary nylon 6I/6T, the present disclosure is not intended to be limited to such combinations. Rather, these Examples are meant to be representative of the improved properties that may be attained with each of the various combinations of base and secondary nylons disclosed throughout the present application.

EXAMPLES

For Examples 1-5, bright trilobal 34 filament 100 denier continuous multifilament yarns were manufactured using nylon 6,6 (having a relative viscosity of either 40 (standard) or a relative viscosity of 60 (high molecular weight (HMW)) as the base nylon and nylon 6I/6T (commercially available as SVPX-115 from Shakespeare Company, LLC) as the secondary nylon, according to an embodiment of the disclosure. A comparative reference yarn was prepared with 34 filament 100 denier continuous filament yarn using nylon 6,6 (standard) as the base nylon without any secondary nylon.

The yarns were manufactured in a standard fully drawn yarn (FDY) process in which polymer pellets were weighed and blended into a feeder and an extruder melted the polymer and mixed the polymers and any additives. Next, an extruder head, melt pipe, and static mixer were used to equilibrate the melt at a uniform temperature and increase mixing, and a spin beam was used to divide the polymer flow into different streams. A meter pump and spinneret were used to produce dozens or hundreds of molten filaments with uniform shear history and temperature and then a quench delay and air quench were used to cool the filaments. Next a finish applicator system was used to add lubricant to the filaments and the filaments were combined to form a filament bundle or yarn. A feed roller then fed the yarn to three or four (although other numbers may be used) pairs of Godet rolls, of which one or more pairs (typically two) were heated. The yarn then traveled through an interlace jet and a take-up winder.

In the industry, the "draw ratio" is understood to be the ratio of linear speed between the feed roller and the last Godet roll pair. The draw ratio that may be used on a particular filament yarn is dictated by the properties of the filament yarn, including the rate of crystallization of the material. It is desirable to increase the draw ratio to process the filaments at an increased speed, and therefore at an increased output; however, increasing the draw ratio to in excess of what the filament material can withstand results in breakage of the yarn.

The comparative sample of nylon 6,6 yarn was able to be drawn at a draw ratio of 4.8, whereas the samples containing 4% of the secondary nylon surprisingly were able to be drawn at a draw ratio of 6.7 on the same equipment, with no operability loss. This increase in draw ratio was surprising and indicates that significant improvements in output may be achieved with the filaments of the present disclosure.

Example 1

The comparative nylon 6,6 and 4% secondary nylon yarns were then exposed to heat at 350° F. for 50 seconds and subsequently conditioned at room temperature for 24 hours. Each of the yarns was then elongated until its breaking point, according to ASTM D2256, and the percent elongation at break and tenacity were measured for each of the yarns. The percent enhancement in tenacity over yarn made using the nylon 6,6 as the base nylon without any secondary nylon was calculated, as shown in Table 1 below.

TABLE 1

Tenacity, % Enhancement over Control, and % Elongation at Break of Dry Conditioned Yarns

|  | Nylon 6, 6 | Nylon 6, 6 with 4% Nylon 6I/6T | HMW Nylon 6, 6 with 4% Nylon 6I/6T |
|---|---|---|---|
| Tenacity (gpd) | 4.4 | 6.3 | 7.1 |
| % enhancement | 100% | 143% | 161% |
| % elongation at break | 37% | 25% | 22% |

The yarns were then immersed in water for 1 hour, blotted dry, and each of the yarns was then elongated until its breaking point, according to ASTM D2256, and the percent elongation at break and tenacity were measured for each of the yarns. The percent enhancement in tenacity over yarn made using the nylon 6,6 as the base nylon without any secondary nylon was calculated, as shown in Table 2 below.

TABLE 2

Tenacity, % Elongation at Break, and % Change from Dry Yarn Properties, of Wet Yarns

|  | Nylon 6, 6 | Nylon 6, 6 with 4% Nylon 6I/6T | HMW Nylon 6, 6 with 4% Nylon 6I/6T |
|---|---|---|---|
| Tenacity (gpd) | 4.1 | 6.1 | 6.9 |
| % elongation at break | 35% | 26% | 20% |
| % change from dry filament properties | 7% | 3% | 3% |

Surprisingly, as shown in the tables above, the nylon 6,6 containing just 4% of the 6I/6T secondary nylon exhibited dramatically improved properties. These yarns showed higher tenacity and a smaller change in properties when wet than the control nylon 6,6 filament without any secondary nylon.

This combination of higher tenacity and smaller change when wet in tenacity and elongation of the yarns containing the secondary nylon beneficially enables that use of lower weight yarns/filaments to achieve the same strength (i.e., tenacity) of a fabric. For example, with a tenacity of 6.9 gpd versus 4.1 gpd, it is estimated that one would require about ⅓ lower fabric weight to achieve similar weight bearing properties with the 6.9 gpd tenacity yarns. Thus, lightweight, but high strength filaments, yarns, and fabrics may be manufactured. Alternatively, if a similar weight of fabric is desired, the overall weight bearing properties of that fabric will increase for the higher tenacity yarns or filaments.

Example 2

4 to 5 mg samples of the yarn, as described above, were heated to 300° C. at a rate of about 20° C./min, until each of the yarns became a flowable melt, and then cooled from 300° C. to 25° C. at a rate of about 20° C./min. The polymer melts were observed to determine the temperature at which crystallization began, and the enthalpy change upon crystallization was measured. The results are shown in Table 3 below.

TABLE 3

Onset of Crystallization Temperature and Enthalpy Change Upon Crystallization for Yarns

|  | Nylon 6, 6 | Nylon 6, 6 with 4% Nylon 6I/6T | HMW Nylon 6, 6 with 4% Nylon 6I/6T |
|---|---|---|---|
| Onset of Crystallization (° C.) | 221 | 223.7 | 223.1 |
| Enthalpy (J/g) | 49.3 | 42.8 | 42.6 |

Surprisingly, the temperature of the onset of crystallization of the yarns containing just 4% of the secondary nylon was notably higher than that of the unmodified nylon 6,6 yarns, and the enthalpy upon crystallization of the yarn containing just 4% of the secondary nylon was significantly lower than that of the nylon 6, 6 yarn. The higher crystallization temperature and lower enthalpy of the modified yarns indicates that these modified yarns crystallize slower than the unmodified nylon 6,6 yarns without the secondary nylon. It is theorized that this slower crystallization rate may allow for the modified filaments to be produced and drawn at faster rates, as explained above.

Differential scanning calorimetry (DSC) crystallization curves for the experimental samples unexpectedly showed a shift in baseline at ~130° C., which is consistent with the glass transition temperature of nylon 6I/6T. Moreover, each sample containing nylon 6I/6T surprisingly showed a similar glass transition temperature peak, indicating that the secondary nylon is well mixed in the polymer, which was not expected given the phase separation that typically occurs in polymer mixtures in which the majority component is known to crystallize faster than the minority component.

Example 3

Yarn samples as described above were conditioned in a lab at 23° C. and 50% relative humidity for over 24 hours and then weighed, vacuum dried, and weighed again once dried. The percent change in weight between the conditioned yarns and the vacuum dried yarns is shown in Table 4 below.

TABLE 4

Percent Weight Change of Conditioned versus Vacuumed Yarns

|  | Nylon 6, 6 | Nylon 6, 6 with 4% Nylon 6I/6T | HMW Nylon 6, 6 with 4% Nylon 6I/6T |
|---|---|---|---|
| Weight Change Conditioned vs. Vacuum | 1.71% | 1.10% | 1.07% |

Surprisingly, the weight change upon drying of the nylon 6,6 yarns containing 4% of the 6I/6T secondary nylon was significantly less than that of the unmodified nylon 6,6 yarn without any secondary nylon. In other words, the modified nylon 6,6 yarns containing 4% 6I/6T absorbed less water than the unmodified nylon 6,6 yarns. The lower water absorption of the modified yarns will beneficially make fabrics made from these filaments less likely to wrinkle than fabrics made of unmodified nylon 6,6 filaments without the secondary nylon.

Example 4

The yarns described above were immersed in water for 24 hours in a controlled lab condition of 23° C. They were then removed from the water, blotted dry, and their lengths were measured. The yarns were then conditioned in the lab maintained at 23° C. and 50% relative humidity for 24 hours, where they were allowed to dry out, and then the lengths of the yarns were measured again. The length of the conditioned sample was then calculated as a percentage of the wet sample, as shown in Table 5 below.

TABLE 5

Length of Conditioned Sample as % of Wet Sample of Yarns

|  | Nylon 6, 6 | Nylon 6, 6 with 4% Nylon 6I/6T | HMW Nylon 6, 6 with 4% Nylon 6I/6T |
|---|---|---|---|
| Length of Conditioned Sample as % of Wet Sample | 97.9% | 98.6% | 98.7% |

Surprisingly, the nylon 6,6 with 4% 6I/6T yarns exhibited much less of a change in length between their wet and conditioned states than the unmodified nylon 6,6 filaments without any secondary nylon. This smaller change in length between wet and conditioned states would contribute to wrinkle resistance of fabrics made from filaments comprising nylon 6,6 with 4% 6I/6T.

Example 5

The yarns described above were washed to remove finish, then soaked in water for 24 hours, blotted dry, and held in a conditioned lab (23° C. and 50% relative humidity) for 24 hours. DSC was used to measure heat flow in each sample as it was raised from 25° C. to 300° C. at 20° C./min. During the initial heating process, a temperature peak was observed that can be correlated to moisture loss. The area under the peak is reported as the enthalpy required to dry the yarns, as shown below in Table 6.

TABLE 6

Peak Temperature and Enthalpy of Drying for Yarns

|  | Nylon 6, 6 | Nylon 6, 6 with 4% Nylon 6I/6T | HMW Nylon 6, 6 with 4% Nylon 6I/6T |
|---|---|---|---|
| Peak Temperature (° C.) | 112 | 107 | 106 |
| Enthalpy (J/g) | 2.1 | 1.7 | 1.5 |

Surprisingly, the modified yarns made from nylon 6, 6 with 4% 6I/6T had significantly lower peak temperatures during drying and thereby required less energy to dry than yarns made from nylon 6,6 without any secondary nylon. This means that fabrics made from these modified yarns containing secondary nylons beneficially would require less energy to dry than unmodified nylons without any secondary nylons.

Example 6

A standard one-step bulked continuous filament (BCF) process was used to produce 20 dpf, 600 denier yarn. The standard BCF machine (i.e., one-step process) includes weighing and blending polymer pellets into a feeder, after which an extruder melts the polymer and mixes the polymers and any additives. An extruder head, melt pipe, and static mixer are used to equilibrate the melt at a uniform temperature and increase mixing, and a spin beam is used to divide the polymer flow into different streams. A meter pump and spinneret are used to produce dozens or hundreds of molten filaments with uniform shear history and temperature. Next a quench delay and quench are used to cool the filaments. The filaments then travel through an interlace jet. Next a finish applicator system is used to add lubricant to the filaments. A feed roller then feeds the yarn to two (although other numbers may be used) pairs of Godet rolls, of which one or more pairs (typically one) are heated. The yarn then travels along a bulking jet and cooling roll, followed by a take-up roll, and winder.

In the industry, the "draw ratio" is understood to be the ratio of linear speed between the feed roller and the last pair of Godet rolls. The draw ratio that may be used on a particular filament is dictated by the properties of the filament, including the rate of crystallization of the material. It is desirable to increase the draw ratio to process the filaments at an increased speed, and therefore increased output; however, increasing the draw ratio to in excess of what the filament material can withstand results in breakage of the filament.

A comparative sample yarn was made using standard nylon 6 and an experimental yarn was made using standard nylon 6 with 6% nylon 6I/6T. A second experimental sample was made using standard nylon 6 with 8% nylon 6I/6T. The comparative sample of nylon 6 yarn was able to be drawn at a draw ratio of 2.75, whereas the sample containing 6% of the secondary nylon surprisingly was able to be drawn at a draw ratio of 3.75 on the same equipment, with no operability loss. This increase in draw ratio was surprising and indicates that significant improvements in output may be achieved with the filaments of the present disclosure.

In the industry, the "linear speed" of the process is understood to be the speed at which the winder is running, which represents the output of the process (i.e., the length of yarn being wound per duration). On typical BCF machines, the upper limit of the output (i.e., linear speed), like the draw ratio, is dictated by the speed that the filaments can withstand without breakage. The linear speed varies significantly based on the polymer being used. For example, polypropylene based yarns typically run approximately 60 to 70% faster than nylon 6,6 based yarns, while nylon 6 and polyethylene terephthalate (PET) run somewhere in between. It is theorized that the crystallization rate of the polymer being processed impacts the maximum linear speed attainable.

Using the above described BCF machine, the sample containing 6% of the secondary nylon allowed for an increase of linear speed of about 20% over the maximum linear speed attainable with the comparative sample of nylon 6 yarn, with no operability loss. Moreover, the sample containing 8% of the secondary nylon was able to be run at even higher speeds.

It will be apparent to those skilled in the art that various modifications and variations can be made to the present disclosure without departing from the spirit and scope of the invention. Thus, it is intended that the present disclosure cover the modifications and variations of this invention provided they come within the scope of the appended claims and their equivalents.

I claim:

1. A multifilament comprising:
    a filament that comprises a composite material comprising
        (i) a main structural component consisting of a mixture of one or more aliphatic nylons and one or more semiaromatic nylons, and optionally (ii) an additive component mixed with the main structural component,
    wherein the filament has a draw ratio which is at least 20% greater than that of an otherwise equivalent filament having a main structural component consisting of the one or more aliphatic nylons, and
    wherein the one or more semiaromatic nylons are present in the composite material in an amount of from about 2 percent, by weight, to about 10 percent, by weight.

2. The multifilament of claim 1, wherein:
    the one or more aliphatic nylons are selected from nylon 6,6, nylon 6, nylon 6,69, nylon 6,66, nylon 66,6, nylon 6,12, nylon 6,10, nylon 11, nylon 12, and mixtures thereof, and
    the one or more semiaromatic nylons are selected from MXD6, 6I/6T, 6T/6I, DT/DI, DI/DT, 6I/6T/DI/DT, 6I/DI, 6T/DT, Dicycan-I, Dimetyldicycan-I, Dimethyldicycan-T, and Dicycan-T.

3. The multifilament of claim 1, wherein the one or more semiaromatic nylons are present in the composite material in an amount of from about 2 percent, by weight, to about 6 percent, by weight.

4. The multifilament of claim 1, wherein the additive component is present in the composite material in an amount of from about 0.1 percent, by weight, to about 3 percent, by weight.

5. The multifilament of claim 1, wherein the filament has a greater tenacity than a filament consisting of the one or more aliphatic nylons.

6. A multifilament comprising:
    a filament that comprises a composite material comprising
        (i) a main structural component consisting of a mixture of one or more base nylons and one or more secondary nylons, and optionally (ii) an additive component mixed with the main structure component,
    wherein the one or more base nylons and the one or more secondary nylons are present in amounts such that the filament has a greater tenacity than an otherwise equivalent filament having a main structural component consisting of the one or more base nylons, wherein the one or more base nylons consist of one or more aliphatic nylons and the one or more secondary nylons consist of one or more semiaromatic nylons, wherein the filament has a draw ratio which is at least 20% greater than that of an otherwise equivalent filament having a main structural component consisting of the one or more aliphatic nylons, and wherein the one or more secondary nylons are present in the composite material in an amount of from about 2 percent, by weight, to about 10 percent, by weight.

7. The multifilament of claim 6, wherein:

the one or more aliphatic nylons are selected from nylon 6,6, nylon 6, nylon 6,69, nylon 6,66, nylon 66,6, nylon 6,12, nylon 6,10, nylon 11, nylon 12, and mixtures thereof, and the one or more semiaromatic nylons are selected from MXD6, 6I/6T, 6T/6I, DT/DI, DI/DT, 6I/6T/DI/DT, 6I/DI, 6T/DT, Dicycan-I, Dimetyldicycan-I, Dimethyldicycan-T, and Dicycan-T.

8. The multifilament of claim 6, wherein the one or more secondary nylons are present in the composite material in an amount of from about 2 percent, by weight, to about 6 percent, by weight.

9. The multifilament of claim 6, wherein the additive component is present in the composite material in an amount of from about 0.1 percent, by weight, to about 3 percent, by weight.

10. The multifilament of claim 6, wherein the one or more secondary nylons have a glass transition temperature of at least 80° C.

11. The multifilament of claim 10, wherein the one or more base nylons have a glass transition temperature of less than 80° C.

12. The multifilament of claim 10, wherein the one or more base nylons have a glass transition temperate in the range of about 15° C. to about 75° C.

13. The multifilament of claim 6, wherein the multifilament has a tenacity of from about 3 to about 11 grams per denier.

14. A fabric comprising:

a multifilament comprising a plurality of filaments formed from a composite material comprising (i) a main structural component consisting of a mixture of one or more base nylons and one or more secondary nylons, and optionally (ii) an additive component mixed with the main structural component, wherein the one or more base nylons and the one or more secondary nylons are present in the filaments in amounts such that each filament has a greater tenacity than an otherwise equivalent filament having a main structural component consisting of the one or more base nylons, wherein the one or more base nylons consist of one or more aliphatic nylons and the one or more secondary nylons consist of one or more semiaromatic nylons, wherein the one or more base nylons and the one or more secondary nylons are present in the filaments in amounts such that each filament has a draw ratio which is at least 20% greater than that of an otherwise equivalent filament having a main structural component consisting of the one or more aliphatic nylons, and wherein the one or more secondary nylons are present in the composite material in an amount of from about 2 percent, by weight, to about 10 percent, by weight.

15. The fabric of claim 14, wherein:

the one or more aliphatic nylons are selected from nylon 6,6, nylon 6, nylon 6,69, nylon 6,66, nylon 66,6, nylon 6,12, nylon 6,10, nylon 11, nylon 12, and mixtures thereof, and the one or more semiaromatic nylons are selected from MXD6, 6I/6T, 6T/6I, DT/DI, DI/DT, 6I/6T/DI/DT, 6I/DI, 6T/DT, Dicycan-I, Dimetyldicycan-I, Dimethyldicycan-T, and Dicycan-T.

16. The fabric of claim 14, wherein the filaments each have a denier per fiber of from about 0.1 dpf to about 3.5 dpf.

* * * * *